(12) United States Patent
Becker et al.

(10) Patent No.: US 7,590,410 B2
(45) Date of Patent: Sep. 15, 2009

(54) METHOD FOR TRANSMITTING NOTIFICATION MESSAGES ON SUBMITTING MULTIMEDIA MESSAGES TO TELECOMMUNICATIONS DEVICES EMBODIED AS MULTIMEDIA MESSAGE SINKS

(75) Inventors: Thomas Becker, Arnsberg (DE); Jan-Christoph Geiger, Bochum (DE); Werner Goertz, Dorsten (DE); Guido Heling, Dortmund (DE); Peter Mros, Castrop-Rauxel (DE); Stefan Nieder, Isselburg (DE); Albert Ratermann, Bocholt (DE); Stanislaus Willemsen, Dinxperlo (NL); Marco van de Logt, Goch (DE)

(73) Assignee: Siemens Aktiengesellschaft, Munich (DE)

( * ) Notice: Subject to any disclaimer, the term of this patent is extended or adjusted under 35 U.S.C. 154(b) by 87 days.

(21) Appl. No.: 10/508,000

(22) PCT Filed: Mar. 12, 2004

(86) PCT No.: PCT/EP2004/002620

§ 371 (c)(1),
(2), (4) Date: Sep. 16, 2004

(87) PCT Pub. No.: WO2004/082253

PCT Pub. Date: Sep. 23, 2004

(65) Prior Publication Data

US 2006/0003741 A1    Jan. 5, 2006

(30) Foreign Application Priority Data

Mar. 13, 2003   (DE) .............................. 103 11 044

(51) Int. Cl.
*H04M 1/725* (2006.01)
(52) U.S. Cl. .................... 455/412.1; 370/310; 709/203; 379/88.17
(58) Field of Classification Search .............. 455/412.1, 455/412.2, 426.1; 370/310; 709/203; 379/88.17
See application file for complete search history.

(56) References Cited

U.S. PATENT DOCUMENTS 6,233,318 B1 *  5/2001  Picard et al. ............. 379/88.17

FOREIGN PATENT DOCUMENTS

| WO | WO 01/33782 | 5/2001 |
| WO | WO 01/35622 | 5/2001 |
| WO | WO 0133782 A1 * | 5/2001 |

* cited by examiner

*Primary Examiner*—Dwayne Bost
*Assistant Examiner*—Pierre-Louis Desir
(74) *Attorney, Agent, or Firm*—King & Spalding L.L.P.

(57) ABSTRACT

A method is provided for transmitting notification messages for submission of multimedia messages to telecommunications devices embodied as multimedia message sinks, wherein to reduce the effort involved in transmitting notification messages and the associated administration effort in an entity sending the notification message on submission of multimedia messages to telecommunications devices embodied as multimedia message sinks independently of their multimedia capabilities, a service center responsible for sending the notification messages transmits on submission of multimedia messages in a notification message a first notification information which is preferably binary coded, and a second notification information which is preferably embodied as text information, uniformly to different variants of telecommunications devices as regards their multimedia capabilities.

8 Claims, 2 Drawing Sheets

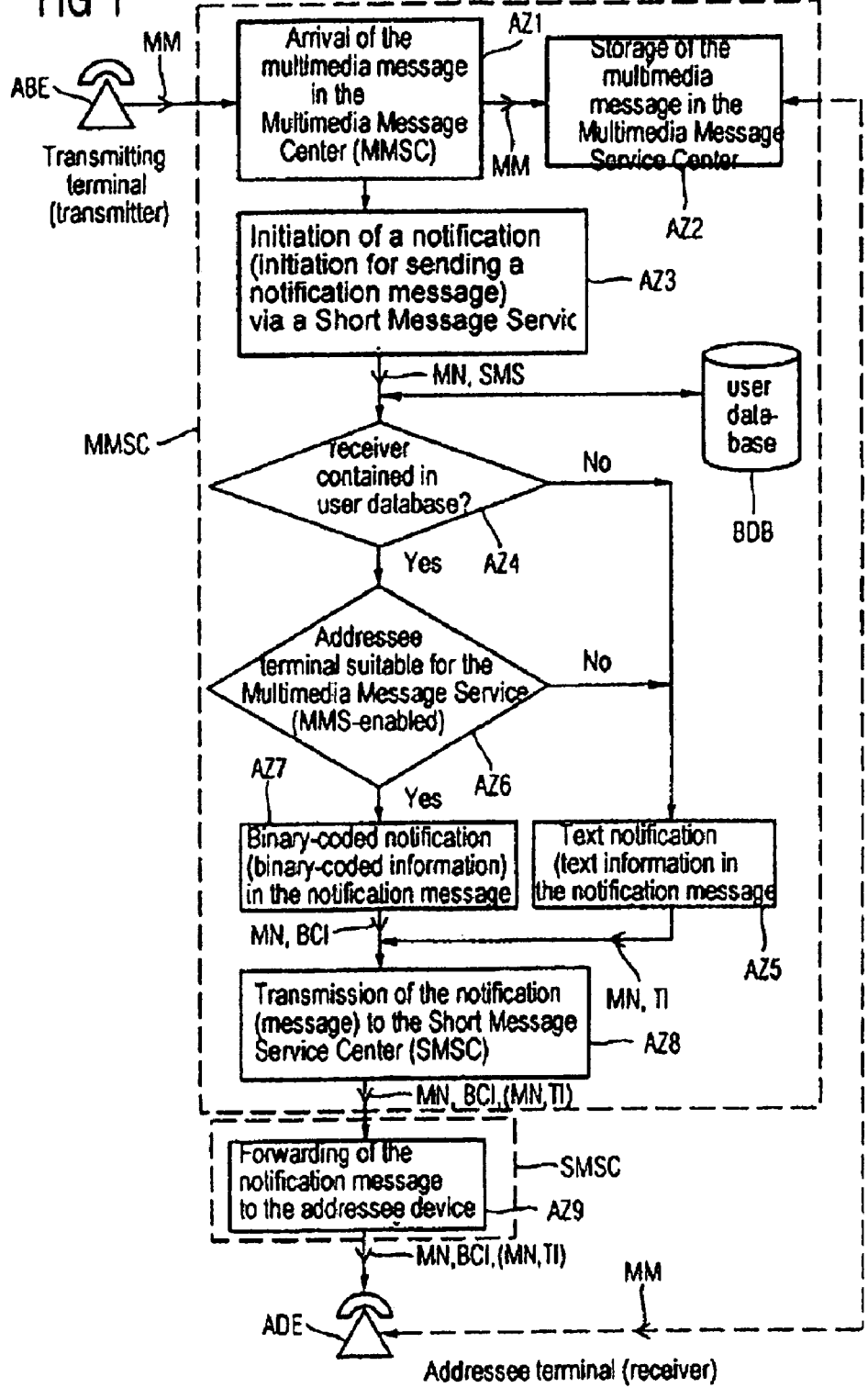
Prior Art

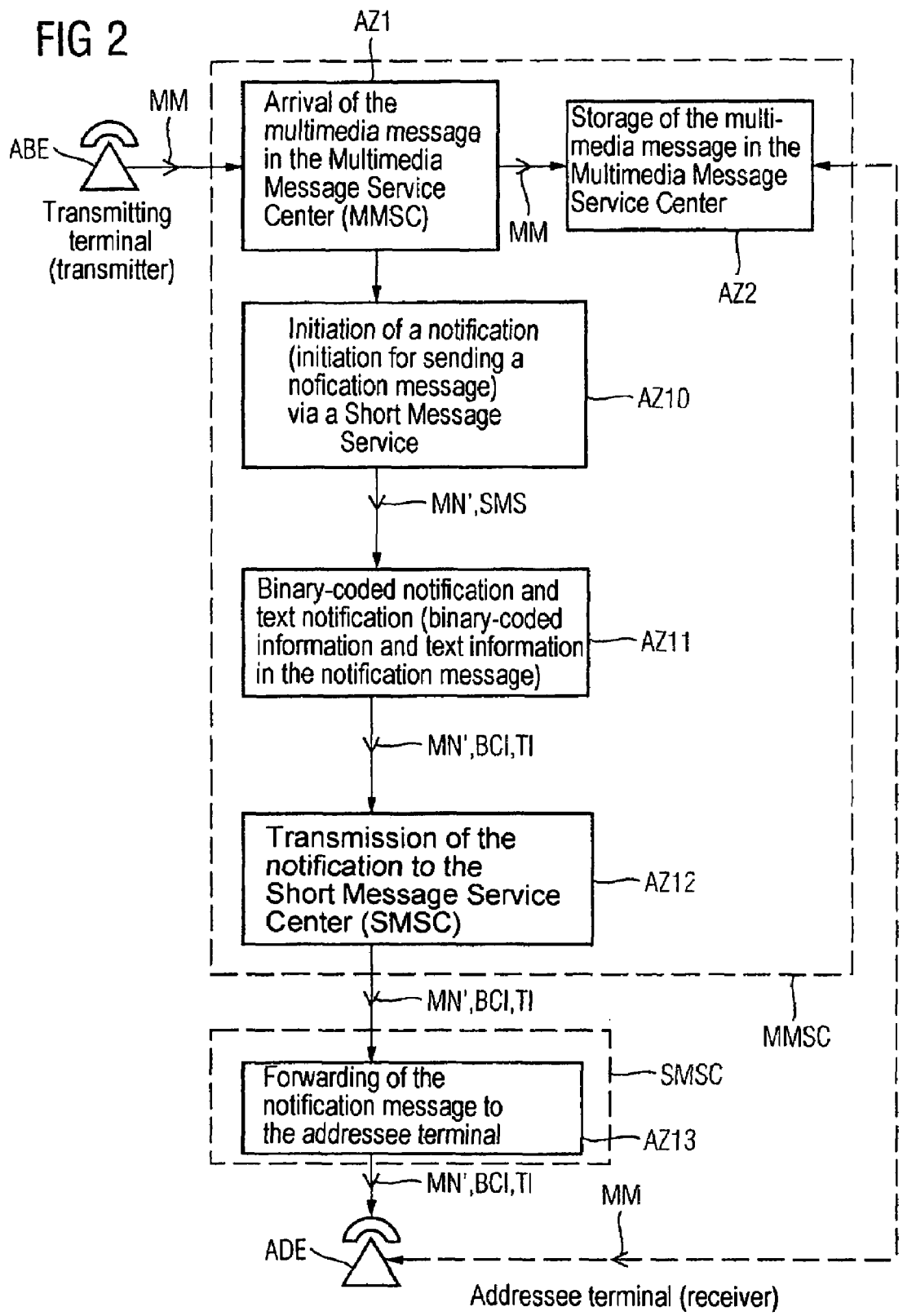

METHOD FOR TRANSMITTING NOTIFICATION MESSAGES ON SUBMITTING MULTIMEDIA MESSAGES TO TELECOMMUNICATIONS DEVICES EMBODIED AS MULTIMEDIA MESSAGE SINKS

BACKGROUND OF THE INVENTION

The transmission (sending and receiving) of service messages (multimedia messages, short messages) to a telecommunications device (for example, a mobile telephone, a cordless telephone consisting of a base station as well as at least one mobile unit, a fixed network telephone, a fax unit, a Personal Computer, a server, etc.) and in the reverse direction from the telecommunications device is a communications service which is to be distinguished with regard to the information content transmitted with the messages (for example, text, multimedia content such as audio/video data (ring tones, screen savers), graphics, programs, etc.) and which first penetrated the mobile radio area and, as a result of widespread acceptance, is now gradually establishing itself in the fixed network area. Of the multiplicity of services offered in the mobile radio network (such as the "Short Message (Messaging) Service (SMS)", the "Enhanced Message (Messaging) Service (EMS)", the "Multimedia Message (Messaging) Service (MMS)", "Instant Messaging", "Over The Air Activation (OTA)", "E-mail", etc.) developments in the fixed network, as in the mobile radio area, appear to be moving towards the SMS and MMS communications services playing a greater role. While the SMS service is already standardized for the mobile radio area and also for the fixed network area (for GSM: ETSI TS 100 942 V7.0.0, Release 1998; for ISDN/: ETSI ES 201 912 V1.1.1, Release January 2002) the same only applies for the MMS service for the mobile radio area (cf . . . :3GPP TS 22.140 V4.y.z; stage 1 and 2; Release 4), by contrast with the fixed network area where standardization activities are currently in progress (cf.: ETSI DES/AT-030023 V0.1.0, November 2003).

The SMS service in the fixed and mobile network is a point-to-point service and is identified by its pure push functionality; i.e., the content of the short message (SM), of which the length is a maximum of 160 bytes, is sent by the Short Message Service Center (SMSC) to the telecommunications device and as a rule consists of text data, with the connection setup being initiated by the service center. Whereas the SMS service in the mobile radio area between the telecommunications device and the Short Message Service Center is a connectionless process in that the short message is transmitted over a signaling channel without a user channel. connection being set up, the execution sequence of the SMS service in the fixed network is connection-oriented in that the user channel connection is established between the telecommunications device and the Short Message Service Center. The short message is then sent over the channel by implementing the service feature Calling Line Identification (CLI), which is referred to as Calling Line Identification Presentation (CLIP), through FSK and/or DTMF signaling (Frequency Shift Keying or Dual Tone Multiple Frequency).

For the MMS service, which is handled in the mobile radio network like the SMS service as a connectionless process via a WAP transport path (use of the Wireless Application Protocol), a different mechanism is used in the fixed network:

For sending a Multimedia Message (MM), for which the size is basically unlimited, but is currently restricted to around 100 kbytes, and in which, for example, text, multimedia content, such as audio/video data (ring tones, screen savers), graphics, programs, etc. (in short text, audio and/or video data) can be contained, a notification message, known as the MMS notification, is initially again sent connection-oriented to the telecommunications device, which informs the telecommunications device that there is a multimedia message at the multimedia message or Multimedia Message Service Center (MMSC). This is done using a push service; for example, the SMS service. Subsequently, unlike the process for receiving a short message, a further connection setup must be initiated by the telecommunications device to the Multimedia service center to receive the content of the multimedia message.

For submission of a multimedia message which is transferred, for example, by a transmitter (a transmit device of a transmit terminal, embodied as a multimedia message source) to an addressee (a receive device or an addressee terminal embodied as a multimedia message sink) or which, formulated in very general terms, is in a Multimedia Message Service Center, by contrast to the Short Message Service, in which the content of the short message is sent to the addressee or the addressee terminal, in which case the connection setup is initiated by the Short Message Service Center, a notification message, known as the MMS notification, is first sent which informs the addressee or the addressee terminal that there is a multimedia message at the Multimedia Message Service Center. The notification message is transmitted via a push service in this case. Whereas for the transmission of the notification message in the fixed network the Short Message Service is preferably used as a push service, the notification message in the mobile network is transmitted based on a Wireless Application Protocol (WAP) service, which particularly represents the framework for Internet access from mobile wireless communicating subscribers, by a special WAP push message.

Subsequently, by contrast with the short message service, a connection setup from the addressee or addressee terminal to the Multimedia Message Service Center is initiated in order to receive the content of the multimedia message. The procedure for submitting a multimedia message described here is presented and explained in more detail in the unpublished international patent applications (int. reference PCT/EP03/14639 and PCT/EP2004/001697).

The transmitting terminal as well as the addressee terminal can, in each case, be a mobile network-specific terminal (for example, a mobile telephone in accordance with the GSM or UMTS standard) or a fixed network-specific terminal (for example, a cordless telephone with a cordless base station assigned to the fixed network and at least one cordless mobile unit in accordance with the DECT standard connected to the cordless base station). On the other hand it is also possible for both devices to be embodied as fixed network telephones, facsimile devices, Personal Computers or even servers.

Notification via a short message in accordance with the "Short Message Service" is used both for addressee terminals which are suitable for the multimedia message service (i.e., are MMS-enabled), and for addressee terminals which are not suitable for the multimedia message service (i.e., not MMS-enabled). Conversely, notification via a WAP push message as per the Wireless Application Protocol (WAP) service is only used for addressee terminals which are suitable for the multimedia message service (i.e., MMS-enabled).

This prior art as regards notification via the short message using the Short Message Service is shown in FIG. 1.

FIG. 1 shows how a transmitting terminal ABE as transmitter sends a "Multimedia Message" (MM) intended for an addressee terminal ADE as receiver to a "Multimedia Message Service Center" (MMSC). This transmitted multimedia message MM enters a first execution state AZ1 at the Multimedia Message Service Center MMSC and is stored in a second execution state AZ2 in a memory of the Multimedia Message Service Center MMSC. In a third execution state AZ3 the Multimedia Message Service Center MMSC causes the notification message MN to be sent to the addressee terminal ADE. This notification message MN is preferably sent in the fixed network using the "Short Message Service" (SMS) whereas the "Wireless Application Protocol" (WAP) service is used as the message carrier in the mobile network.

So that this notification message MN can be sent to the addressee terminal ADE, the Multimedia Message Service Center MMSC checks in a fourth execution state AZ4 whether the receiver of the multimedia message MMN which belongs to the address terminal ADE and/or which the addressee terminal ADE uses is contained or registered in a user database BDB. If this is not the case, then in a fifth execution state AZ5 the notification message MN is executed as a text notification, in which case the notification message MN as first notification information preferably contains text information T1.

If, however, it is established in the fifth execution state AZ4 that the receiver is contained or registered in the user database, then in the sixth execution state AZ6 of the Multimedia Message Service Center MMSC a check is made as to whether the addressee terminal ADE is suitable for the Multimedia Message Service (MMS); i.e., is MMS-enabled.

If it is not, the notification message is again executed as a text notification in the fifth execution state AZ5, in which the text information TI is contained in the notification message MN.

If, however, it is established in the sixth execution state AZ6 that the addressee terminal ADE is MMS-enabled, then in a seventh execution state AZ7 of the Multimedia Message Service Center MMSC the notification message MN is executed as a binary coded notification which contains the notification message MN as binary coded information BCI.

As a result of the two requests in the fourth execution state AZ4 and in the sixth execution state AZ6, in an eighth execution state AZ8 of the Multimedia Message Service Center MMSC either the binary-coded notification MN, BMI or the text notification MN, TI is sent from the Multimedia Message Service Center MMSC in accordance with the SMS bearer characteristics for the notification message to a Short Message Service Center SMSC.

The notification message MN sent from the Multimedia Message Service Center MMSC as binary-coded notification or text notification is forwarded by the Short Message Service Center SMSC in a ninth execution state AZ9 to the addressee terminal ADE.

As a result of this forwarded notification message MN the addressee terminal ADE, provided this is an MMS-enabled terminal which can evaluate the binary-coded notification MN, BCI, is finally in the position to fetch or download the multimedia message MM stored in the second execution state AZ2 from the Multimedia Message Service Center MMSC (dashed connecting line in FIG. 1 between the addressee terminal ADE and the second execution state AZ2 in the Multimedia Message Service Center MMSC).

In general, with this known execution sequence, there is the problem that the Multimedia Message Service Center MMSC transmitting the notification message or the "Gateway", used for the transmission, in this case the Short Message Service Center SMSC, must possess knowledge of whether for the message in the addressee terminal ADE an MMS-enabled or a non-MMS-enabled terminal is involved, to enable a suitable MMS notification, the binary-coded notification MN, BCI or the text notification MN, TI to be sent.

For an SMS-based bearer for the MMS notification of MMS-enabled terminal, a short message is used which contains a notification in binary-coded form. The MMS functionality in the MMS-enabled terminal is in a position to evaluate this binary-coded notification and, for example, to fetch or download the multimedia message identified in the notification from the Multimedia Message Service Center.

For an SMS-based bearer for the MMS notification of non-MMS-enabled terminals, a short message is used which contains a notification as normal text. This text information points, for example, to an Internet address from which the corresponding multimedia message can be retrieved.

An object of the present invention is to specify a method for transmitting notification messages for submission of multimedia messages to telecommunications devices embodied as multimedia message sinks, in which the effort for transmission of the notification message and the associated administration effort in an entity sending the notification message is reduced for submission of the multimedia message to the telecommunications devices embodied as multimedia message sinks independently of their multimedia capability.

SUMMARY OF THE INVENTION

The idea underlying the present invention is that a service center responsible for sending notification messages for the submission of multimedia messages to telecommunications devices embodied as multimedia sinks transmits in a notification message a first notification information which, in one embodiment, is preferably binary coded, and a second notification information which, in a further embodiment, is preferably embodied as text information, uniformly to telecommunications devices which different characteristics as regards their multimedia capability.

Through the combination of the first binary-coded information embodied as first notification information and the MMS notification embodied as second notification information in the form of a normal text it is especially possible for MMS-enabled and non-MMS-enabled telecommunications devices to be uniformly informed about the presence of a multimedia message in the Multimedia Message Service Center, that is to always receive the same MMS notification. The previously-required distinction between MMS-enabled and non-MMS-enabled telecommunications devices and the associated choice of the relevant suitable MMS notification in the service center responsible for the MMS notification is thus dispensed. The Short Message Service (SMS) in accordance with one embodiment is preferably used as bearer for the notification The scenario specified here, the combination of the binary-coded MMS-notification with the MMS notification in text form and use of the Short Message Service is also compatible with "Short Message Service" (SMS) in the mobile network which allows binary data and text information to be sent via what is known as the User Data Header mechanism. This mechanism is, for example, also used for embedding of Enhanced Message Service (EMS) elements (for example, images and melodies), into a short message.

Alternatively, the present invention also can be applied to other bearers for the notification of a variant of the Wireless Application Protocol service still to be defined with a modified WAP push message, if necessary specialized for use in the mobile network or a variant of the Message Waiting Indication (MWI) service still to be defined with a modified MW message, if necessary specialized for use in the fixed network.

An advantage of the present invention lies in the fact that the service center responsible for sending the notification message, such as the Multimedia Message Service Center responsible for submitting the multimedia message or a gateway used for sending in the case of the SMS bearer for the notification the Short Message Service Center, now does not need to have any knowledge of whether the telecommunications device to be notified is an MMS-enabled or a non-MMS-enabled device. This results in a simplification of the notification process.

A further advantage is that with temporary non-availability of the MMS functionality of the telecommunications device, the text information of the MMS notification which has arrived can be read and used by the user. If the MMS functionality of the telecommunications device is available at a later time, the binary-coded information of the notification can be evaluated in order to then download the multimedia message, for example.

This scenario arises, for example, with SMS-enabled cordless-base stations of cordless telephones to which, as telecommunications devices in addition to SMS-enabled cordless mobile units, MMS-enabled cordless mobile units are also operated, where the temporary non-availability of the MMS functionality is, for example, achieved by bringing the MMS-enabled cordless mobile unit outside its range and the text information of the MMS notification received is read and used by the user at the SMS-enabled cordless mobile unit.

Should, however, the SMS-enabled cordless mobile unit temporarily not be available and only a cordless mobile unit be available which has neither SMS functionality nor MMS functionality, the text information of the MMS notification still makes the notification usable, since in this case the notification message is usually submitted via what is known as a Text-To-Speech functionality of the service center responsible.

Additional features and advantages of the present invention are described in, and will be apparent from, the following Detailed Description of the Invention and the Figures.

BRIEF DESCRIPTION OF THE FIGURES

FIG. 1 shows a combined block diagram/flowchart showing the transmission of a notification for the submission of a multimedia message which, for example, originates from a transmitting terminal (transmitter) to an addressee terminal (receiver).

FIG. 2, using FIG. 1 as a starting point, shows a modified combined block diagram and flowchart for presentation of the transmission of a notification message for the submission of a multimedia message which, for example, again originates from a transmitter to a receiver.

DETAILED DESCRIPTION OF THE INVENTION

FIG. 2 shows how the transmitting terminal ABE as transmitter again sends a Multimedia Message (MM) intended for the addressee terminal ADE as receiver to the Multimedia Message Service Center MMSC. The multimedia message MM sent again arrives in a first execution state AZ1 at the multimedia message center MMSC and is stored in the second execution state AZ2 in a memory of the Multimedia Message Service Center MMSC. In a tenth execution state AZ10 the Multimedia Message Service Center MMSC causes a notification message MN' modified with respect to the notification message MN shown in FIG. 1 to be sent to the addressee terminal ADE. This notification message MN' is, preferably, again sent in the fixed network via the Short Message Service SMS.

In a subsequent eleventh execution state AZ11 of the Multimedia Message Service Center MMSC the notification message MN' is executed as a text notification, in which the notification message MN again preferably contains the text information TI as its first notification information TI and as a binary coded notification, in which the notification message MN again contains the binary coded information BCI.

Then, in a twelfth execution state AZ12 of the Multimedia Message Service Center MMSC, both the binary-coded notification MN', BCI and the text notification MN', TI are sent jointly from the Multimedia Message Service Center MMSC in accordance with the SMS bearer capabilities for the notification message to a Short Message Service Center SMSC.

The notification message MN' sent from the Multimedia Message Service Center MMSC as binary coded notification and text notification are forwarded by the Short Message Service Center SMSC in a thirteenth execution state AZ13 to the addressee terminal ADE.

On the basis of this forwarded notification message MN, the addressee terminal ADE, provided it is an MMS-enabled terminal which can evaluate the binary-coded notification MN', BCI, is finally in a position to fetch or download the multimedia message MM stored in the second execution state AZ2 from the Multimedia Message Service Center MMSC (dashed connection in FIG. 1 between the addressee terminal ADE und the second execution state AZ2 in the Multimedia Message Service Center MMSC).

With this execution sequence the problem known from FIG. 1 no longer arises whereby with the Multimedia Message Service Center MMSC transmitting the multimedia message or the gateway used for transmission, in the present case the Short Message Service Center SMSC, must have knowledge of whether the addressee terminal ADE is an MMS-enabled or a non-MMS-enabled terminal, to enable a corresponding suitable MMS notification, the binary-coded notification MN, BCI or the text notification MN, TI to be sent.

Thus, with an SMS-based bearer for the MMS notification, a short message is used both by MMS-enabled terminals and by non-MMS-enabled terminals which contains a notification in binary-coded form and as normal text. The MMS functionality in the MMS-enabled terminal is in a position to evaluate the binary-coded notification and, for example, to fetch or to download the multimedia message identified in the notification from the Multimedia Message Service Center, while in the non-MMS-enabled terminal the text information shown, for example, in a display of the terminal in the notification points, for example, to an Internet address under which the corresponding multimedia message can be retrieved.

As an alternative to the short message service SMS in the fixed network it is also possible to use a modified "Message Waiting Indication" service still to be defined in relation to the known "Message Waiting Indication" service with a modified "MWI" message as notification message bearer. This modified "Message Waiting Indication" service must be defined here in such a way that the modified "MWI" message can be used, for example, to transmit text information and binary-coded information. If one wishes to achieve the same scenario in the mobile network as the fixed network, then either, based on the known "Wireless Application Protocol (WAP)" service, a modified "Wireless Application Protocol" service with a modified "WAP push" message is required, with which, for example, text information and binary-coded information also can be transmitted or the Short Message Service SMS with the variant shown in FIG. 2 or the modified "Message Waiting Indication" service still to be defined with the modified "MWI" message must be introduced.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting notification messages in a submission of multimedia messages to telecommunications devices embodied as multimedia message sinks, the method comprising:

generating a joint notification message intended for a target telecommunications device without knowledge of whether or not the target telecommunications device is suitable for handling multimedia messages, the joint notification message including both (a) a text notification that a multimedia message is available for retrieval from a service center and (b) a binary-coded notification that the multimedia message is available for retrieval from the service center; and transmitting the joint notification message including both the text notification information and binary-coded notification regarding the multimedia message to the target telecommunications device, such that:

if the target telecommunications device is suitable for handling multimedia messages, the target telecommunications device can evaluate the binary-coded notification and in response retrieve the multimedia message from the service center; and if the target telecommunications device is not suitable for handling multimedia messages, the target telecommunications device can evaluate the text notification and in response retrieve the multimedia message from the service center.

2. A method for transmitting notification messages as claimed in claim 1, wherein the joint notification message is transmitted as a short message using a Short Message Service.

3. A method for transmitting notification messages as claimed in claim 1, wherein the joint notification message is transmitted as a modified WAP push message using a modified Wireless Application Protocol service.

4. A method for transmitting notification messages as claimed in claim 1, wherein the joint notification message is transmitted as a modified MWI message using a modified Message Waiting Indication service.

5. A method for transmitting notification messages as claimed in claim 1, wherein a telecommunications device suitable for multimedia messages is used as a transmitting terminal and a telecommunications device suitable for short messages and unsuitable for multimedia messages is used as the target telecommunications device.

6. A method for transmitting notification messages as claimed in claim 1, wherein a telecommunications device suitable for multimedia messages is used as a transmitting terminal and a telecommunications device suitable for multimedia messages is used as the target telecommunications device.

7. A service center for generating and transmitting notification messages regarding multimedia messages in a communications network, the service center comprising logic instructions embodied in computer-readable media and executable by one or more processors operable to:

generate a joint notification message intended for a target telecommunications device without knowledge of whether or not the target telecommunications device is suitable for handling multimedia messages, the joint notification message including both (a) a text notification that a multimedia message is available for retrieval from a service center and (b) a binary-coded notification that the multimedia message is available for retrieval from the service center; and transmit the joint notification message including both the text notification information and binary-coded notification regarding the multimedia message to the target telecommunications device, such that:

if the target telecommunications device is suitable for handling multimedia messages, the target telecommunications device can evaluate the binary-coded notification and in response retrieve the multimedia message from the service center; and if the target telecommunications device is not suitable for handling multimedia messages, the target telecommunications device can evaluate the text notification and in response retrieve the multimedia message from the service center.

8. A telecommunications device for use in a communications network, the telecommunications device comprising logic instructions embodied in computer-readable media and executable by one or more processors operable to:

receive, from a service center storing a multimedia message intended for delivery to the telecommunications device, a joint notification message including both (a) a text notification that the multimedia message is available for retrieval from the service center and (b) a binary-coded notification that the multimedia message is available for retrieval from the service center;

if the telecommunications device is suitable for handling multimedia messages, evaluate the binary-coded notification and, in response, retrieve the multimedia message from the service center; and if the telecommunications device is not suitable for handling multimedia messages, evaluate the text notification and, in response, retrieve the multimedia message from the service center.

* * * * *